US007048096B2

United States Patent
Ozechowski

(10) Patent No.: US 7,048,096 B2
(45) Date of Patent: May 23, 2006

(54) INCREMENTAL BRAKING APPARATUS AND METHOD OF BRAKING

(76) Inventor: Russell Ozechowski, P.O. Box 74, Center Valley, PA (US) 18034

( * ) Notice: Subject to any disclaimer, the term of this patent is extended or adjusted under 35 U.S.C. 154(b) by 68 days.

(21) Appl. No.: 10/729,020

(22) Filed: Dec. 8, 2003

(65) Prior Publication Data

US 2005/0121266 A1    Jun. 9, 2005

(51) Int. Cl.
 *F16D 51/00* (2006.01)
(52) U.S. Cl. .............. 188/74; 188/68; 188/75; 188/82.7; 188/82.77
(58) Field of Classification Search ............ 188/74, 188/75, 76, 68, 82.7, 82.77, 82.74; 192/73, 192/46, 71; 74/411.5, 527, 531
See application file for complete search history.

(56) References Cited

U.S. PATENT DOCUMENTS

| | | | | |
|---|---|---|---|---|
| 1,303,110 A | * | 5/1919 | Pfleeger | 188/31 |
| 1,555,724 A | * | 9/1925 | Tuppen | 188/171 |
| 3,738,672 A | * | 6/1973 | Dalton | 280/3 |
| 3,990,541 A | * | 11/1976 | Dobrinska et al. | 188/31 |
| 4,416,460 A | * | 11/1983 | Morris | 280/3 |
| 4,804,283 A | * | 2/1989 | Imai | 400/234 |
| 5,287,950 A | * | 2/1994 | Feathers et al. | 188/83 |
| 6,155,390 A |   | 12/2000 | Ozechowski | |
| 6,199,442 B1 | * | 3/2001 | Bauer et al. | 74/411.5 |
| 6,394,255 B1 | * | 5/2002 | Mohammed-Fakir et al. | 192/139 |

* cited by examiner

*Primary Examiner*—Thomas Williams
*Assistant Examiner*—Mariano Sy
(74) *Attorney, Agent, or Firm*—Rader, Fishman & Grauer PLLC

(57) ABSTRACT

An incremental braking apparatus and method includes a first rotating member having a plurality of rigid stops spaced circumferentially around an outer cylindrical surface of the first rotating member, and a plurality of flexible stops arranged in a plurality of rows on a stationary member. The flexible stops are selectively movable toward the first rotating member from a disengaged position into an engaged position in which the flexible stops engage the rigid stops to provide a braking action on the first rotating member. An actuator with a beveled edge for engaging the outer ends of the flexible stops is operable to move a selected number of rows of the flexible stops into their engaged positions to provide an incremental braking effect. The rows of flexible stops are staggered such that the flexible stops in adjacent rows are not in circumferential alignment.

20 Claims, 5 Drawing Sheets

DIRECTION OF ROTATION

INCREMENTAL BRAKING APPARATUS AND METHOD OF BRAKING

BACKGROUND OF THE INVENTION

1. Field of the Invention

The present invention relates to the field of brakes. More specifically, the present invention relates to an incremental braking apparatus and method for braking that uses an interface of flexible stops and rigid stops to provide an incremental braking effect.

2. Description of the Related Art

Brakes are used in a much wider variety of applications than is commonly recognized. The most obvious example of brakes is found in the common automobile. Typically, all the wheels in an automobile, whether car, truck or industrial vehicle, incorporate a braking mechanism to slow or stop the vehicle when moving. Similarly, bicycles are another common example of devices that utilize braking mechanisms.

Additionally, however, brakes may be used in many other types of machinery which have moving parts that must be periodically slowed or stopped. For example, elevators must employ brakes to regulate the travel of the elevator. Some electric generators or motors use brakes to regulate revolutions.

While modern braking technology continues to advance, many problems remain. For example, brakes by their nature are subject to extreme wear and tear. In automobiles, unequal demands are placed on the brakes when the automobile is turning. The brakes on the wheels inside of the turn need to exert less force than the brakes on the wheels on the outside of the turn. These unbalanced forces prevent braking from being as smooth and even as it otherwise would be. Moreover, the wear on the braking mechanisms is increased.

The Applicant has previously disclosed an incremental braking apparatus in U.S. Pat. No. 6,155,390, which provides a novel braking interface that solves many of the problems with the existing braking systems described above. The braking apparatus disclosed in the '390 patent incrementally applies a braking force using a plurality of flexible stops having unequal lengths that engage a rigid stop on the braked member. The present invention provides an improvement over the braking apparatus disclosed in the Applicant's '390 patent by providing, among other things, an improved actuation system and layout for the flexible stops.

SUMMARY OF THE INVENTION

It is an object of the present invention to meet the above-described needs and others. Specifically, it is an object of the present invention to provide a method of braking and a braking mechanism that can more evenly distribute braking forces. More specifically, it is an object of the present invention to provide a brake interface and method of braking that incrementally applies braking force as it is needed.

It is a further object of the present invention to provide an incremental braking apparatus having an improved actuator and arrangement of flexible stops that allow a selected number of rows of the flexible stops to be engaged with rigid stops on the braked member.

It is a further object of the present invention to provide an incremental braking apparatus having a plurality of staggered rows of flexible stops that provide a compact arrangement without interference between the flexible stops in adjacent rows during braking.

To achieve the stated and other objects, the present invention may be embodied as an incremental braking apparatus including a first rotating member having a plurality of rigid stops spaced circumferentially around an outer cylindrical surface of the first rotating member, and a plurality of flexible stops arranged in a plurality of rows on a stationary member. The flexible stops are selectively movable one row at a time toward the first rotating member from a disengaged position into an engaged position in which the flexible stops engage the rigid stops to provide a braking action on the first rotating member. An actuator with a beveled edge for engaging the outer ends of the flexible stops is operable to move a selected number of rows of the flexible stops into their engaged positions to provide an incremental braking effect. The rows of flexible stops are staggered such that the flexible stops in adjacent rows are not in circumferential alignment, thereby allowing the grid of flexible stops to be more compact and functional.

According to a broad aspect of the present invention, a braking apparatus, is provided comprising: a first rotating member having at least one rigid stop thereon; a plurality of flexible stops which are selectively movable toward the first rotating member to engage the at least one rigid stop; and an actuator which is slidable to selectively engage the plurality of flexible stops and cause the flexible stops to move toward the first rotating member to engage the rigid stop on the first rotating member.

According to another broad aspect of the present invention, a braking apparatus is provided, comprising: a first rotating member having a plurality of rigid stops thereon, the rigid stops being spaced circumferentially around an outer cylindrical surface of the first rotating member; a plurality of flexible stops arranged in a plurality of rows, the flexible stops being selectively movable toward the first rotating member from a disengaged position into an engaged position in which the flexible stops engage the rigid stops as the first rotating member rotates; and an actuator which is operable to move a selected number of rows of the flexible stops into their engaged positions to provide incremental braking of the first rotating member.

According to another broad aspect of the present invention, a method of braking is provided comprising the steps of: providing a first rotating member having rigid stops spaced circumferentially therearound, and a plurality of rows of flexible stops which are movable toward the first rotating member to engage the rigid stops; and moving a selected number of rows of the flexible stops toward the first rotating member to engage the rigid stops and provide incremental braking of the first rotating member. More specifically, the method includes the step of sliding an actuator into engagement with the flexible stops to move the flexible stops toward the first rotating member one entire row at a time to provide the incremental braking effect.

Numerous other objects of the present invention will be apparent to those skilled in this art from the following description wherein there is shown and described a preferred embodiment of the present invention, simply by way of illustration of some of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

A braking apparatus having an incremental actuation system and staggered rows of flexible stop members according to preferred embodiments of the present invention will now be described in detail with reference to FIGS. 1 to 9 of the drawings. It will be appreciated that the principles of the present invention may be applied to any type of brake, and that the invention is not limited to the particular examples described below.

Figure 1:
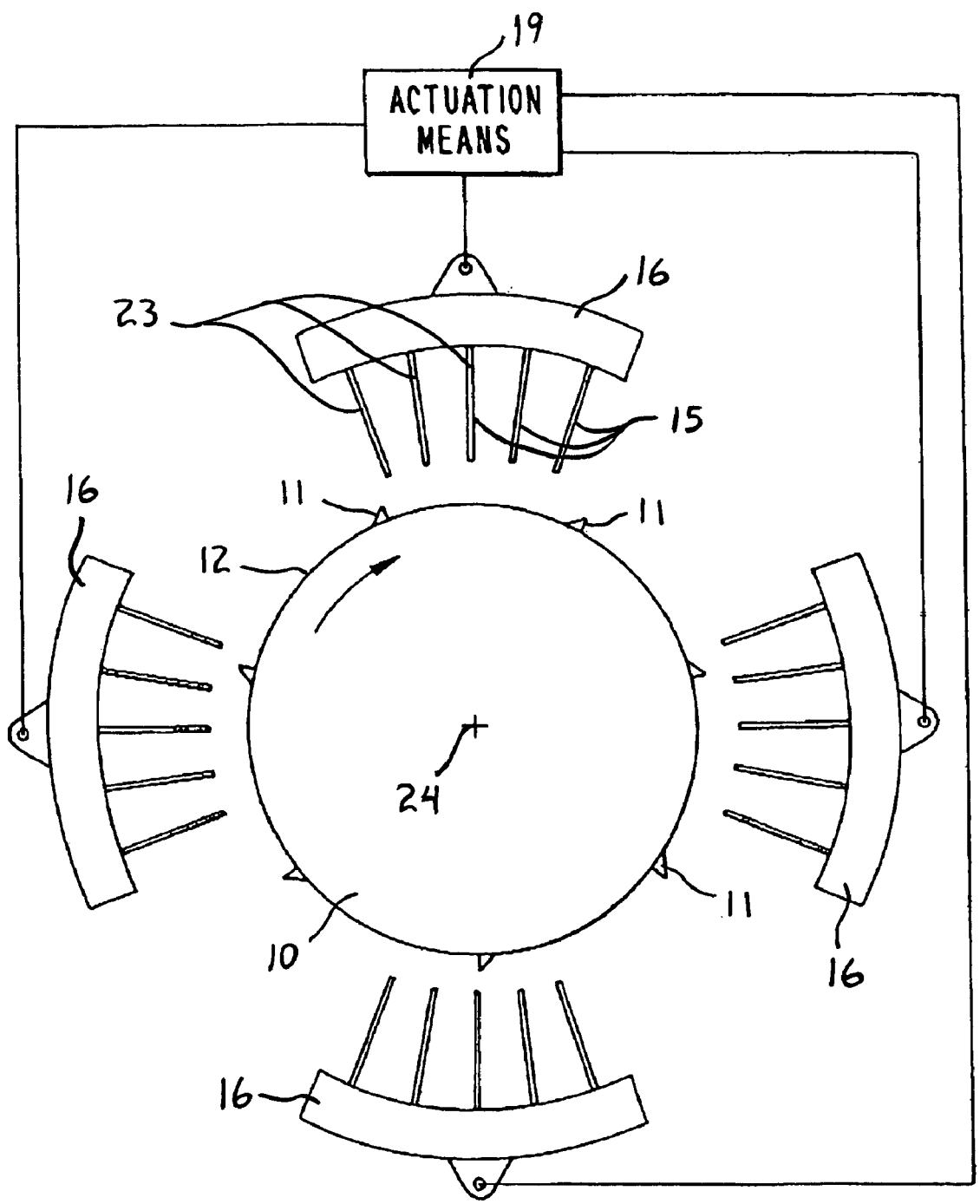
FIG. 1 is a side view of a braking apparatus according to a first embodiment of the present invention, with the braking members shown in a disengaged position.
Figure 8:
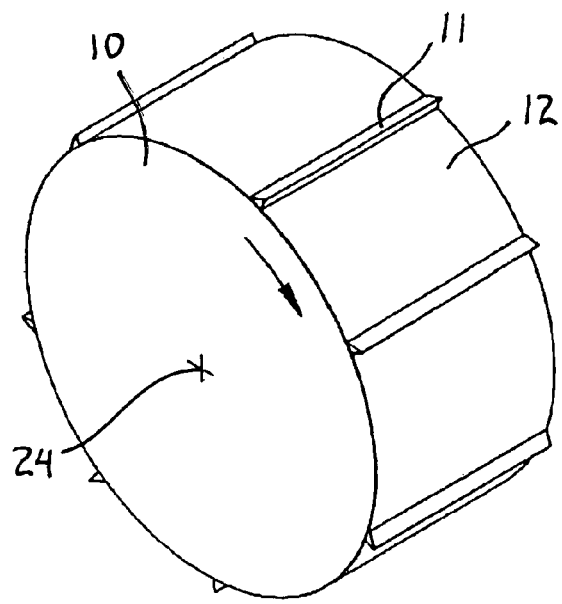
FIG. 8 is a perspective view of the braked member according to the first embodiment, showing the rigid stops positioned around the circumference thereof.

As shown in FIG. 1, a first rotating member 10 is provided having at least one, and preferably several, rigid stops 11 spaced circumferentially about an outer cylindrical surface 12 thereof. The rigid stops 11 are elevated ridges that project radially outwardly from the outer surface 12 of the first rotating member 10. The rigid stops 11 extend axially along the outer cylindrical surface 12 of the first rotating member 10 across the width of the engagement surface thereof, as shown in FIG. 8.

The particular structure of the rigid stops 11 may take a variety of forms. For example, as shown in FIGS. 1 to 4, 7 and 8, the rigid stops 11 may have a cross section in the form of a right triangle. In this case, the upstanding side of the triangle provides a blunt leading face 13 relative to a direction of rotation of the first rotating member 10, and the tapered side of the triangle provides a tapered trailing face 14. The blunt leading face 13 projects radially outwardly from an outer surface 12 of the first rotating member 10 for engaging the flexible stops (described below). The tapered trailing face 14 tapers from an outer point of the blunt leading face 13 to the outer surface 12 of the first rotating member 10.

Figure 5:
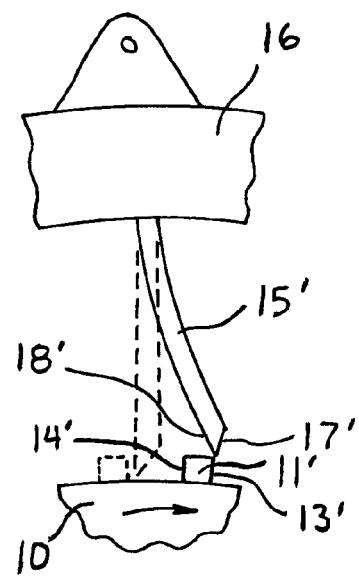
FIG. 5 is an enlarged side view of the interface between one row of braking members and the braked member according to a second embodiment of the present invention.
Figure 6:
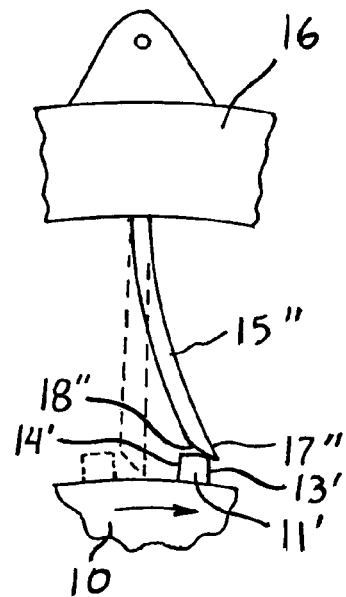
FIG. 6 is an enlarged side view of the interface between one row of braking members and the braked member according to a third embodiment of the present invention.
Figure 7:
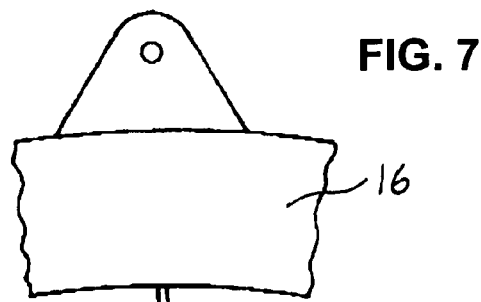
FIG. 7 is an enlarged side view of the interface between one row of braking members and the braked member according to the first embodiment.

In the alternative embodiments shown in FIGS. 5 and 6, the rigid stops 11' have a cross section shape in the form of a rectangle with blunt faces 13', 14' on both the leading and trailing sides. The rigid stops 11' in these alternative embodiments extend axially along the outer cylindrical surface of the first rotating member, similar to the rigid stops 11 shown in FIG. 8.

Figure 2:
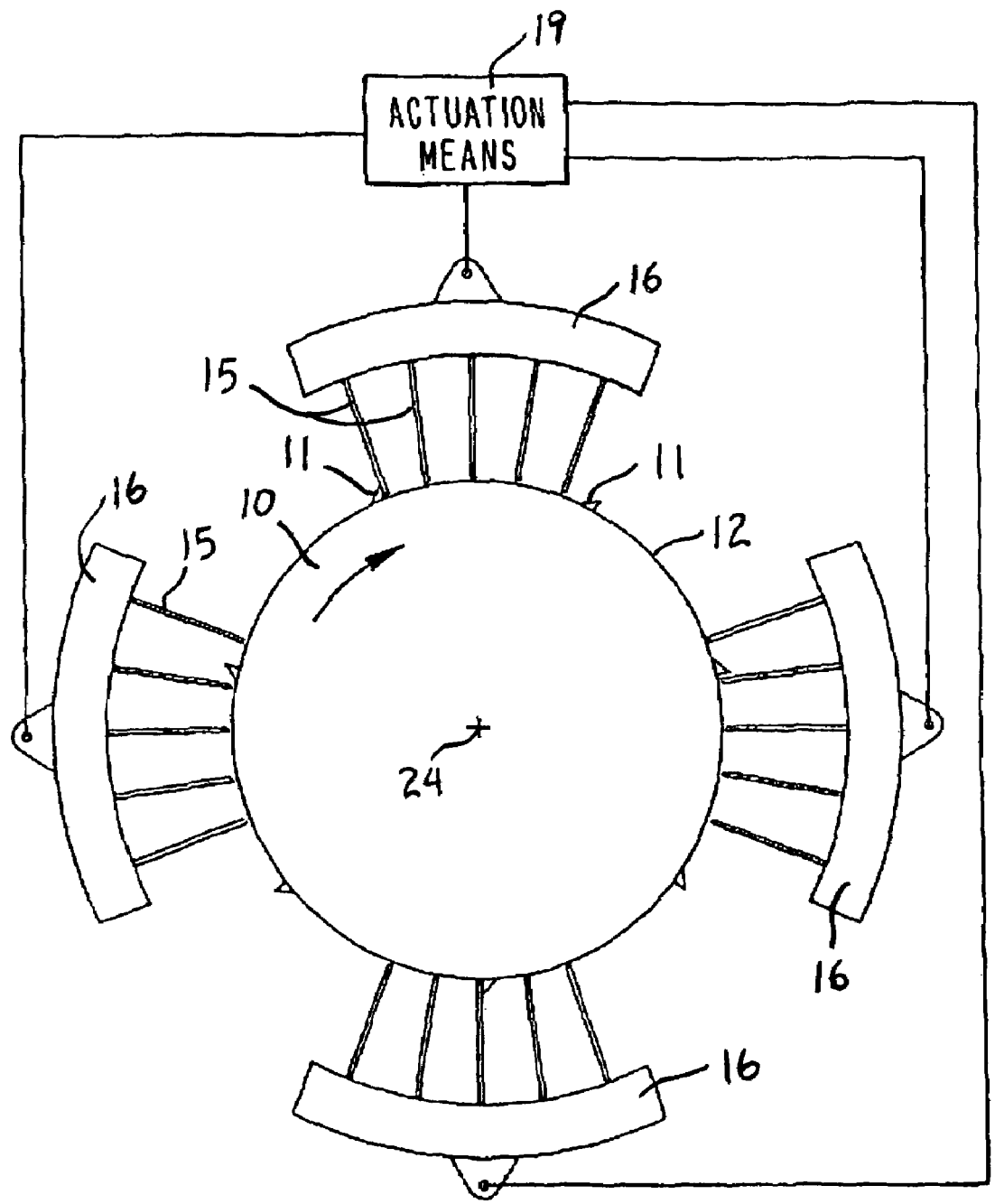
FIG. 2 is a side view of the braking apparatus according to the first embodiment, with all of the braking members shown in an engaged position.
Figure 3:
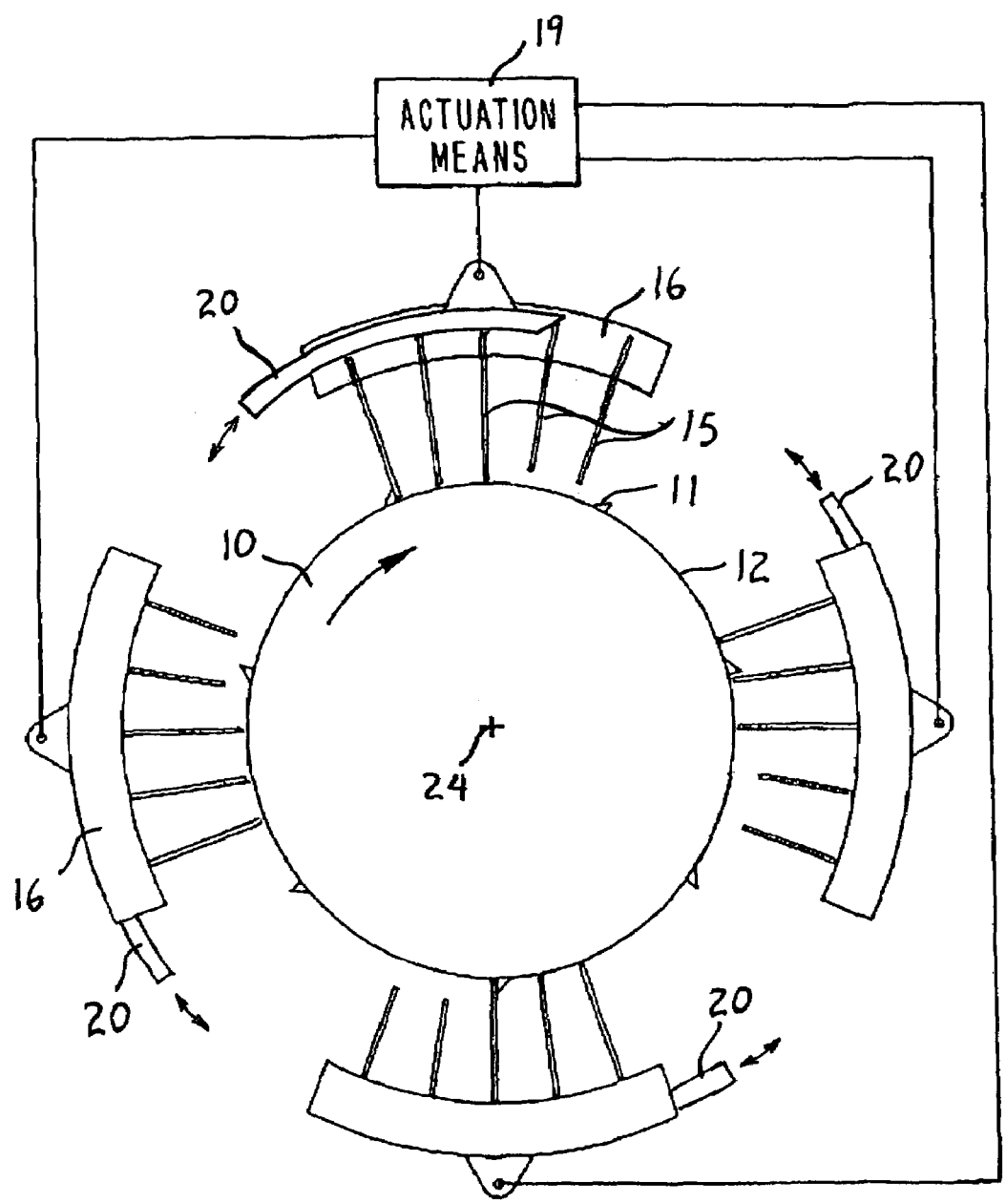
FIG. 3 is a side view of the braking apparatus according to the first embodiment, with a portion of the braking members shown in an engaged position and a portion of the braking members shown in a disengaged position.

A plurality of flexible stops 15 are supported by one or more stationary members 16. The stationary members 16 may be brake calipers in the case of disc brake systems, or brake shoes in the case of drum brake systems. In FIGS. 1 to 3, four stationary members 16 are circumferentially spaced about the first rotating member 10 and support four respective groups of flexible stops 15 at equidistant locations around the first rotating member 10. The flexible stops 15 are selectively movable between their disengaged position, as shown in FIG. 1, and their fully engaged position, as shown in FIG. 2.

The flexible stops 15 have longitudinal axes and are movable along their respective longitudinal axes toward and away from the first rotating member 10. The flexible stops 15 are moved toward the first rotating member 10 to their engaged position to engage the rigid stops 11 when braking action is desired on the first rotating member 10. The flexible stops 15 are preferably tabs that are thin enough so that they can flex in either direction along the circumferential direction of rotation of the first rotating member 10. The flexible stops 15 must have sufficient flexibility to permit passage of the rigid stops 11. For example, the flexible stops 15 can be made from stainless steel. The particular structure of the flexible stops 15 can be as disclosed in the Applicant's U.S. Pat. No. 6,155,390, which is incorporated herein by reference.

Figure 4:
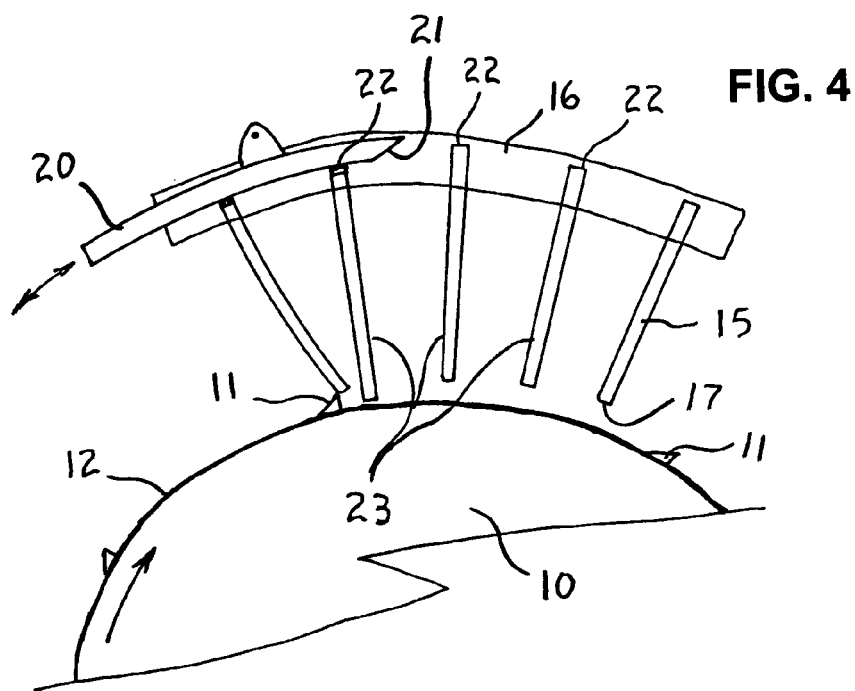
FIG. 4 is an enlarged side view of a portion of the braking apparatus showing a sliding actuator holding two rows of braking members in an engaged position.

The lower ends 17 of the flexible stops 15 can be flat, as shown in FIG. 4, or the lower ends can be in the form of a tapered edge, as shown in FIGS. 5 and 6. The tapered lower end of the flexible stop 15' shown in FIG. 5 provides a blunt leading face 18' for engaging the rigid stops 11 during braking, and a tapered trailing face 17'. On the other hand, the tapered lower end of the flexible stop 15" shown in FIG. 6 provides a tapered leading face 18" for engaging the rigid stops 11 during braking, and a blunt trailing face 17". A blunt leading face 18' on the flexible stops will provide a greater braking force than the tapered leading face 18", while the tapered leading face may provide a slightly quieter operation. It is contemplated that some applications will prefer an arrangement in which the rigid stops 11 engage the blunt faces 18', 17" of the flexible stops 15 when braking the forward motion of a vehicle, and engage the tapered faces 17', 18" of the flexible stops 15 when braking reverse motion of the vehicle. This would provide a greater braking force for high forward speeds of the vehicle, and a relatively smaller braking force for the typically lower reverse speeds of the vehicle. The blunt and tapered faces 13, 14 of the rigid stops 11 of the embodiment shown in FIGS. 4 and 7 could also be arranged in this manner (i.e., the blunt faces 13 are leading during a forward motion, and the tapered faces 14 are leading during a reverse motion).

Each flexible stop 15 preferably includes a spring (not shown) that allows the flexible stop 15 to retract into the stationary member 16 a given distance. A spring stop (not shown) is provided to limit the retraction of the flexible stop 15 into the stationary member 16.

FIGS. 3 and 4 show a slidable actuator 20 that is provided to selectively engage each group of flexible stops 15. A group of actuators 20 can be controlled by a common actuation means 19 for simultaneous operation. The actuator 20 is slidable within the stationary member 16 along a circumferential path that intersects the longitudinal axes of the flexible stops 15 and is spaced from the first rotating member 10. The actuator 20 has a beveled leading surface 21 for engaging the outer ends 22 of the flexible stops 15. The beveled surface 21 of the actuator provides a camming action that forces the flexible stops 15 to move toward the first rotating member 10 as the actuator 20 slides over and past the outer ends 22 of the flexible stops 15. In an alternative arrangement, outer ends 22 of the flexible stops 15 are beveled instead of, or in addition to, the beveled surface 21 of the actuator 20. In either case, the interface between the actuator 20 and the flexible stops 15 includes a beveled surface that provides the desired camming action to force the flexible stops 15 to move toward the first rotating member 10. The sliding movement of the actuator 20 is used to change the number of flexible stops 15 engaging the rigid stop 10 to provide an incremental braking effect which is superior to the functioning of previous braking systems.

The flexible stops 15 are arranged in a plurality of rows 23 with each row comprising a plurality of the flexible stops 15. The rows 23 of flexible stops 15 run perpendicular to the arc through which the first rotating member 10 rotates, along lines that are generally parallel to an axis of rotation 24 of the first rotating member 10 and parallel to the rigid stops 11. The actuator 20 has a width in an axial direction that allows the actuator 20 to simultaneously engage all of the flexible stops 15 in a row 23. The actuator 20 is slidable to selectively engage the outer ends 22 of the flexible stops 15 with the beveled surface 21 to move each row 23 of flexible stops 15 simultaneously toward the first rotating member 10. The actuator 20 is operable to move a selected number of rows 23 of the flexible stops 15 into their engaged positions to provide incremental braking of the first rotating member 10.

As can be seen in the drawings, the number of flexible stops 15 is greater than the number of rigid stops 11 in the preferred embodiment. The precise number of flexible stops 15 and rigid stops 11 can vary and will depend on the particular application and braking force required.

The dimensions of the flexible stops 15 and rigid stops 11 are also variable depending on the particular application and braking force required. For example, the flexible stops 15 may have a length of about 1½ inches, and the rigid stops 11 may protrude to a height of about ⅛ inch from the outer surface 12 of the rotating member 10. This provides a ratio of about 12 to 1 for the length of the flexible stops 15 and the height of the rigid stops 11. This ratio of about 12 to 1 has been determined to be a preferred ratio for the length of the flexible stops 15 and the height of the rigid stops 11 because it provides a sufficient engagement interface for transmitting the braking force, allows the flexible stops 15 to be arranged in a compact formation, minimizes heat buildup from friction, and avoids any instances of over-bending that might lead to permanent deformation.

Figure 9:
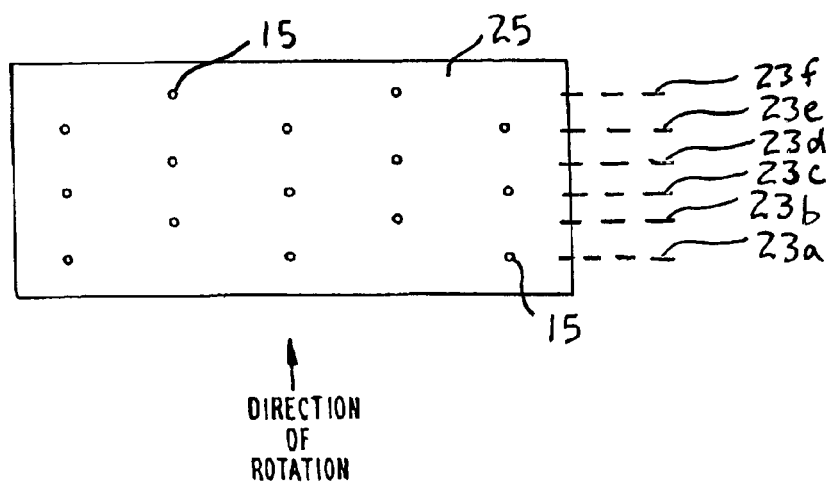
FIG. 9 is a plan view of an array of flexible stop members and the grid holding the array of flexible stop members according to the first embodiment.

As shown in FIG. 9, the flexible stops 15 are arranged in a matrix and held in their respective positions by a grid 25. The exemplary matrix shown in FIG. 9 has six rows 23a–23f of flexible stops 15 with the rows 23a–23f running perpendicular to the indicated direction of rotation. The bottom row 23a of the illustrated matrix includes three flexible stops 15, the next row 23b above the bottom row 23a includes two flexible stops 15, the next row 23c includes three flexible stops 15, and so on. The rows 23a–23f are staggered so that the flexible stops 15 of adjacent rows are offset from one another. That is, the flexible stops 15 of adjacent rows are not in circumferential alignment with each other. The staggered arrangement of the flexible stops 15 allows for a more compact arrangement of a high number of flexible stops 15 and avoids interference between the flexible stops 15 in adjacent rows during braking. Thus, the staggered rows 23a–23f provide a significant improvement over the prior art.

The structure of the braking apparatus according to various embodiments of the present invention is described above. A method of braking according to the present invention will now be described by explaining the operation of the braking apparatus.

The braking apparatus includes the first rotating member 10 having rigid stops 11 spaced circumferentially therearound, and a plurality of rows 23 of flexible stops 15 which are movable toward the first rotating member 10 to engage the rigid stops 11. The slidable actuator 20 is operable to move a selected number of rows 23 of the flexible stops 15 toward the first rotating member 10 to engage the rigid stops 11. The actuator 20 has a beveled leading face 21 that spans across an entire row 23 of flexible stops 15. Thus, the actuator 20 can engage and move the flexible stops 15 toward the first rotating member 10 one entire row 23 at a time. By changing the relative position of the slidable actuator 20, the number of rows 23 of flexible stops 15 engaged with the rigid stops 11 can be precisely controlled to provide an incremental braking effect on the first rotating member 10.

As explained above, the rows 23 of flexible stops 15 are each arranged along a line 23a–23f extending generally parallel to an axis of rotation 24 of the first rotating member 10 and perpendicular to a circumferential direction of rotation thereof. The rows 23 of flexible stops 15 are staggered such that the flexible stops 15 of adjacent rows 23 are not in circumferential alignment with each other. As a result, the rows 23 of flexible stops 15 can be placed closer together in a compact arrangement, and a smooth and continuous incremental braking action can be achieved.

The preceding description has been presented only to illustrate and describe the invention. It is not intended to be exhaustive or to limit the invention to any precise form disclosed. Many modifications and variations are possible in light of the above teachings.

The disclosed embodiments were chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims, which should be construed as broadly as the prior art will permit.

What is claimed is:

1. A braking apparatus, comprising:
    a first rotating member having at least one rigid stop thereon;
    a plurality of flexible stops which are selectively movable toward said first rotating member to engage said at least one rigid stop; and
    an actuator which is slidable to selectively engage said plurality of flexible stops and cause said flexible stops to move toward said first rotating member to engage the rigid stop on said first rotating member;

wherein said actuator is arranged such that sliding movement thereof changes the number of said flexible stops engaging said rigid stop to provide incremental braking.

2. The braking apparatus according to claim 1, wherein said actuator is slidable along a circumferential path spaced from said first rotating member.

3. The braking apparatus according to claim 1, wherein said flexible stops are arranged in a plurality of rows with each row comprising a plurality of the flexible stops, and said actuator is slidable to selectively engage said flexible stops to move all of the flexible stops in each row simultaneously toward said first rotating member.

4. The braking apparatus according to claim 3, wherein said first rotating member has a plurality of rigid stops thereon, and said rigid stops are spaced circumferentially around said first rotating member and disposed in a generally axial direction on an outer cylindrical surface of said first rotating member.

5. The braking apparatus according to claim 4, wherein said rows of flexible stops are arranged generally parallel to said rigid stops.

6. The braking apparatus according to claim 1, wherein a ratio of a length of said flexible stops to a height of said rigid stops is about 12 to 1.

7. The braking apparatus according to claim 1, wherein said actuator comprises a sliding member having at least one beveled surface for engaging the flexible stops and moving the flexible stops toward the first rotating member.

8. The braking apparatus according to claim 1, wherein said actuator comprises a sliding member for engaging the flexible stops, and an interface between said sliding member and said flexible stops comprises a beveled surface for moving the flexible stops toward the first rotating member.

9. The braking apparatus according to claim 1, wherein said flexible stops have longitudinal axes and are movable along their respective longitudinal axes toward and away from said first rotating member.

10. The braking apparatus according to claim 9, wherein said sliding member is arranged to slide along a path that intersects said longitudinal axes of said flexible stops.

11. A braking apparatus, comprising:
a first rotating member having a plurality of rigid stops thereon, said rigid stops being spaced circumferentially around an outer cylindrical surface of said first rotating member;
a plurality of flexible stops arranged in a plurality of rows, said flexible stops being selectively movable toward said first rotating member from a disengaged position into an engaged position in which the flexible stops engage said rigid stops as the first rotating member rotates; and
an actuator which is operable to move a selected number of rows of said flexible stops into their engaged positions to provide incremental braking of said first rotating member.

12. The braking apparatus according to claim 11, wherein said rows of flexible stops are staggered so that the flexible stops of adjacent rows are offset from one another in both circumferential and axial directions of said first rotating member.

13. The braking apparatus according to claim 11, wherein said rows of flexible stops each comprises a plurality of flexible stops arranged along a line which is parallel to an axis of rotation of the first rotating member.

14. The braking apparatus according to claim 11, wherein said rows of flexible stops are arranged in a matrix and held in position by a grid such that the flexible stops of adjacent rows are not in circumferential alignment with each other.

15. The braking apparatus according to claim 11, wherein said rigid stops each comprises a blunt leading face projecting radially outwardly from an outer surface of said first rotating member for engaging said flexible stops.

16. The braking apparatus according to claim 15, wherein said rigid stops each further comprises a tapered trailing face that tapers from an outer point of the blunt leading face to the outer surface of the first rotating member.

17. The braking apparatus according to claim 11, wherein said flexible stops each comprises a blunt leading face for engaging said rigid stops and a tapered trailing face.

18. A method of braking, comprising the steps of:
providing a first rotating member having rigid stops spaced circumferentially therearound, and a plurality of rows of flexible stops which are movable toward said first rotating member to engage said rigid stops; and
moving a selected number of rows of said flexible stops toward said first rotating member to engage the rigid stops and provide incremental braking of the first rotating member.

19. The method of braking according to claim 18, wherein said step of moving said flexible stops comprises sliding an actuator into engagement with said flexible stops to move said flexible stops toward said first rotating member one entire row at a time.

20. The method of braking according to claim 19, wherein said rows of flexible stops are staggered such that the flexible stops of adjacent rows are not in circumferential alignment with each other.

* * * * *